May 29, 1923.
A. BENSON
RESILIENT TIRE
Filed Nov. 1, 1920
1,456,966
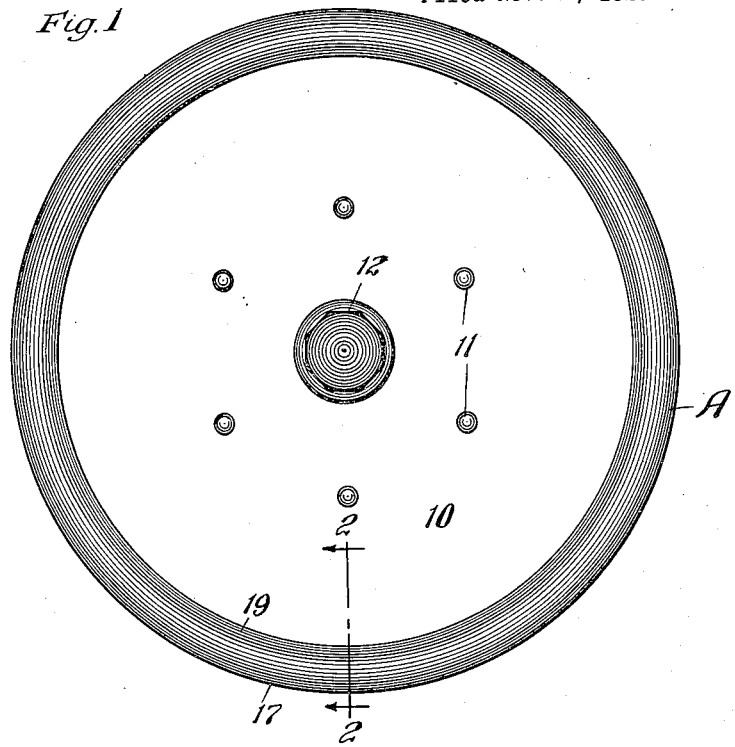
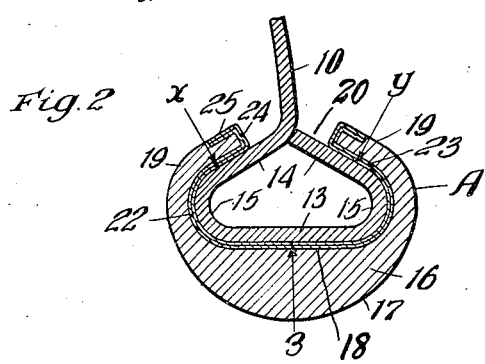
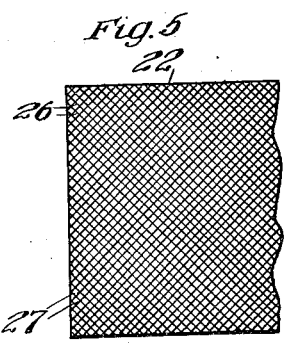
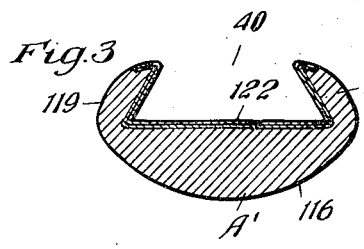
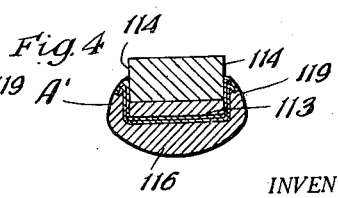
INVENTOR.
Andrew Benson
BY Geo. I. Haight
His ATTORNEY.

Patented May 29, 1923.

1,456,966

UNITED STATES PATENT OFFICE.

ANDREW BENSON, OF STERLING, ILLINOIS.

RESILIENT TIRE.

Application filed November 1, 1920. Serial No. 420,895.

*To all whom it may concern:*

Be it known that I, ANDREW BENSON, a citizen of United States, residing at Sterling, in the county of Whiteside and State of Illinois, have invented a certain new and useful Improvement in Resilient Tires, of which the following is a full, clear, concise, and exact description, reference being had to the accompanying drawings, forming a part of this specification.

This invention relates to improvements in resilient tires.

One object of the invention is to provide an efficient and durable resilient tire of the solid type, which tire is especially adapted for wheels of relatively small diameter, such as those employed on "Irish mails", coaster wagons, and other children's vehicles.

A more specific object of the invention is to provide a durable, resilient tire which is self-clinching when applied to a wheel rim or felly, the construction of the tire being such that it will not creep, loosen, tear, or bulge under ordinary service conditions.

In the drawing forming a part of this specification, Figure 1 is an elevational view of a sheet metal disc wheel showing my improved tire applied thereto. Figure 2 is an enlarged radial section of the wheel and tire illustrated in Figure 1 and corresponding substantially to a line 2—2 of Figure 1. Figure 3 is a radial cross sectional view of a rubber tire illustrating another embodiment of the invention, the tire in this instance being intended for application to a rim or felly of rectangular radial cross section as indicated in Figure 4. Figure 4 is a sectional view showing the tire of Figure 3 applied in position. And Figure 5 is an enlarged detail view illustrating more particularly the manner in which the warp and woof threads of the fabric reinforcing lining, extend.

In said drawing and referring more particularly to Figures 1, 2 and 5, the wheel proper is shown as embodying a pressed main sheet metal disc 10 to the inner side of which is secured a smaller sheet metal disc (not shown) by rivets or bolts 11—11. A hub cap 12 is indicated in Figure 1. In the particular type of wheel shown, the main disc 10 is formed with an integral rim or felly of generally triangular cross section as clearly shown in Figure 2. Said rim has an outer peripheral flat section 13 and converging sides 14—14, the sides merging with the peripheral section 13 by means of bends 15—15. For a more detailed description of the disc wheel proper, reference may be had to my pending application, Serial No. 358,949, filed Febr. 16, 1920. The improved tire is designated generally by the reference character A and is of the so-called "solid" type. The tire is made of continuous annular form, preferably of a suitable grade of rubber properly moulded and vulcanized and reinforced by a fabric lining, as hereinafter described. In order to more efficiently carry out my invention and to better effect the self-clinching of the tire when applied to the wheel rim, as hereinafter described, the tire will preferably be made of a circumference substantially one-sixtieth less than the circumference of the wheel to which it is to be applied so that, the tire, as an entirety, will be slightly circumferentially stretched when applied in position.

The cross section of the tire A is clearly shown in Figure 2 and it will be noted that the tire, considered in cross section, is composed of a main section 16, having a curved periphery 17 and a flat inner face 18, thus constituting substantially a semi-circle. In addition, the tire, still considered in radial cross section, has two inwardly extending flanges 19—19 which converge toward a central diametrical plane. This construction of the tire leaves an inner annularly extending groove or recess as indicated at 20 which is of generally triangular form with an opening of relatively restricted width. In addition, the tire is reinforced with a fabric lining as indicated at 22, which fabric lining extends across the flat face 18, along the inner faces of the flanges 19 as indicated at 23—23, around the free edges of the flanges 19 as indicated at 24—24 and a short distance outwardly along the outer faces of the flange sections 19 as indicated at 25—25. The reinforcing fabric lining 22 may consist of one or a plurality of layers of fabric imbedded within the rubber or other equivalent resilient material of the main portion of the tire proper. In utilizing the reinforcing fabric lining, I consider it important to have the warp and woof threads thereof, indicated respectively at 26 and 27 in Figure 5, extend diagonally of the general or longitudinal direction of the tire proper. The reasons for this arrangement of the threads of the fabric, are explained more in detail hereinafter.

In manufacturing my improved tire, a core or mould of the proper size in cross section is provided to which is first applied the reinforcing fabric lining. Thereafter, the rubber or other equivalent inherently resilient substance is applied to the mould and properly worked or rolled into the desired cross section during which process it is evident that the reinforcing fabric lining becomes imbedded within the mass of rubber or other equivalent material on the inner faces of the tire defining the annular groove 20. The portions of the fabric indicated at 25 are ultimately worked into the external faces of the tire, after which the tire is properly cured or vulcanized until it becomes not only solid but firm and particularly with respect to the flanges 19 which are made of sufficient thickness as to leave them quite stiff and with sufficient inherent rigidity to offer an appreciable resistance to spreading apart or stretching them circumferentially.

The tire, manufactured as hereinabove just described is applied to the wheel rim in the manner shown in Figure 2. During the application of the tire, it will be obvious that the tire as an entirety is circumferentially stretched or expanded, due to the tire being initially formed of slightly lesser circumference than that of the wheel rim as previously set forth. Where the tire is applied to a rim of the type shown in Figure 2, there will result a series of forces which may be resolved into three components on the three sides of the triangular section of the rim as indicated by the three arrows $x$, $y$ and $z$. In other words, the rim of the wheel is clinched by the tire by tension forces acting radially inward around the entire periphery of the rim and, in addition, inwardly upon all faces of the rim at every radial section thereof, I have found that with this construction, the tire is entirely self-clinching, will not creep circumferentially of the wheel, will not slip sideways or transversely of the wheel rim, and will not become locally "bulged" or "humped" as has been a serious disadvantage of prior types of so-called "solid" rubber tires.

The reinforcing fabric lining performs important functions in that it imparts great strength to resist circumferential forces. By arranging the warp and woof threads diagonally as above described, the fabric readily lends itself to the necessary circumferential expansion or stretching of the tire during its application to the wheel rim without danger of the threads becoming ruptured and at the same time, without danger of the fabric losing its tensile strength. Furthermore, by extending the fabric around the free edges of the flanges 19, said free edges are thereby bound and prevented from tearing under any ordinary conditions of application and use.

Referring to the construction illustrated in Figures 3 and 4, the tire A' is generally of substantially the same construction as the tire A hereinbefore described. However, the annular groove on the inner side thereof is defined by three substantially flat sides with a narrow or restricted opening 40. The tire has a main substantially semi-circular body section 116 and inwardly converged sides or flanges 119, a fabric lining 122 being employed as in the construction heretofore described. The essential difference between the tire A' and the tire A merely resides in the formation of the inner annular groove so as to eliminate the curved corners at the wider portions of the groove which are employed in the tire A in order to better conform to the metal rim of the wheel 10. The tire A' is especially designed for application to a rim or felly of rectangular cross section such as commonly found on wood wheels for coaster wagons and the like, said rim having parallel side walls 114—114 and an outer flat periphery 113 which in the instance shown, is constituted by the usual metallic rim. When the tire A' is applied to the rectangular sectioned rim of a wheel, it will be noted that the side flanges 119—119 are laterally separated so that said flanges are, per se, placed under tension and thereby effectively clinch the side walls of the rim. In this connection, it will be understood that the widest dimension of the inner groove of the tire is made to correspond with the width of the rim to which it is applied and the restricted opening 40 will of course be normally less than the transverse dimension of the rim to which the tire is intended to be applied. As in the case of the tire A, the tire A' will be made of slightly less circumference than the circumference of the wheel rim to which it is applied. This will induce a slight circumferential stretching of the tire A', considered as an entirety, when it is applied to the rim. Further detailed description of the tire A' is thought unnecessary, in view of the full description of the tire A.

Because of the simplicity of construction of the tire and its durable characteristics, it may be manufactured at comparatively small expense and is especially desirable for use on wheels of vehicles selling at moderate prices such as children's coaster wagons, "Irish mails," tricycles and the like, although the tire may be utilized to advantage in other fields.

I have herein shown and described what I now consider the preferred manner of carrying out the invention, but the same is merely illustrative and I contemplate all changes and modifications that come within the scope of the claims appended hereto.

I claim:

1. A continuous, annular, self-clinching, resilient tire adapted for application to a wheel provided with a rim of appreciable transverse and radial dimensions in cross section, said tire comprising a main exterior portion of generally semicircular cross section and annular, inwardly extending side flanges normally converged, the inner faces of said main portion and said flanges having a fabric reinforcing lining imbedded therein.

2. A continuous, annular, self-clinching, resilient tire adapted for application to a wheel provided with a rim of appreciable transverse and radial dimensions in cross section, said tire comprising a main exterior portion of generally semicircular cross section and annular, inwardly extending side flanges normally converged, the inner faces of said main portion and said flanges having a fabric reinforcing lining imbedded therein, portions of said fabric lining being also extended around the free edges of said flanges to the exterior faces thereof to thereby bind said free edges and prevent tearing thereof.

3. A continuous, annular, self-clinching, resilient tire adapted for application to a wheel provided with a rim of appreciable transverse and radial dimensions in cross section, said tire comprising a main exterior portion of generally semicircular cross section and annular, inwardly extending side flanges normally converged, the inner faces of said main portion and said flanges having a fabric reinforcing lining imbedded therein, the warp and woof threads of said fabric lining extending diagonally of the general direction of the tire whereby to compensate for its circumferential bodily expansion, without diminution of tensile strength, when the tire is applied to a wheel rim.

4. As an article of manufacture, an annular resilient tire of the solid type, adapted for application to a wheel having a rim of appreciable transverse and radial dimensions in cross section, with the periphery of the rim flat and of a known circumference, said tire being of slightly lesser circumference than said circumference of the wheel rim, said tire having an inner annularly extending groove of generally triangular formation in cross section with the distance between the opposed inner edge portions of the tire normally less than the transverse dimension of the wheel rim at its periphery.

5. As an article of manufacture, an annular resilient tire of the solid type, adapted for application to a wheel having a rim of appreciable transverse and radial dimensions in cross section, with the periphery of the rim flat and of a known circumference, said tire being of slightly lesser circumference than said circumference of the wheel rim, said tire having an inner annularly extending groove of generally triangular formation in cross section with the distance between the opposed inner edge portions of the tire normally less than the transverse dimension of the wheel rim at its periphery, said tire having also an annularly extending reinforcing fabric lining within said groove, said lining being extended around said inner edge portions of the tire partially along the exterior faces thereof.

In witness that I claim the foregoing I have hereunto subscribed my name this 27th day of Oct., 1920.

ANDREW BENSON.

Witness:
META SCHMIDT.